Aug. 10, 1965 S. F. COIL 3,199,444
CODED TAG PRINTER USING PUNCHED TAGS
Filed Jan. 11, 1963 2 Sheets-Sheet 1

INVENTOR
STANLEY F. COIL
BY
Louis A. Kline
Richard W. Lavin
HIS ATTORNEY

Aug. 10, 1965 S. F. COIL 3,199,444

CODED TAG PRINTER USING PUNCHED TAGS

Filed Jan. 11, 1963 2 Sheets-Sheet 2

INVENTOR
STANLEY F. COIL

BY

HIS ATTORNEY

United States Patent Office 3,199,444

Patented Aug. 10, 1965

3,199,444

CODED TAG PRINTER USING PUNCHED TAGS

Stanley F. Coil, Washington Courthouse, Ohio, assignor to The National Cash Register Company, Dayton, Ohio, a corporation of Maryland Filed Jan. 11, 1963, Ser. No. 250,892

2 Claims. (Cl. 101—45)

This invention relates to a mechanism for recording information contained in a punched merchandise tag and more particularly relates to a device for reproducing on a pressure-sensitive tape the image of a punched merchandise tag, the tape to be processed by an optical reader for the reading of the information represented by the punched holes in the merchandise tag.

In modern-day merchandising methods, data relating to the sale of merchandise is represented by holes punched in a tag attached to the merchandise. An example of such a tag can be found in United States Patent No. 3,014,647, issued to Richard L. Ditmer et al. on December 26, 1961. As disclosed in that patent, the punched merchandise tag is read by a tag reader as part of the data-processing procedure, the information so read then being punched in a paper tape for subsequent use with an electrical digital computer mechanism.

The use of such a tag system stems from the requirement of obtaining sales data quickly in order to control the inventory of the merchandise sold. The recording of information concerning the identification of the merchandise sold at the time of the sale eliminates the danger of the data being lost or mislaid before it could be used.

With a desire to simplify the number of operations in the data-processing procedure without sacrificing any of its desirable characteristics, it is an object of this invention to provide a printing mechanism for registering on a pressure-sensitive tape the image of the punched holes of a merchandise tag in such a manner as to be distinguished by an optical reader, the information so read being transmitted to an electrical digital computer to complete the data-processing operation.

It is a further object of this invention to provide a printer for merchandise tags having means for automatically aligning the tag on the pressure-sensitive recording tape.

It is another object of this invention to provide a mechanism, which is simple in construction and operation, for registering the image of a merchandise tag on a pressure-sensitive tape.

With these and other, incidental, objects in view, the invention includes certain novel features of construction and combinations of parts, a preferred form or embodiment of which is hereinafter described with reference to the drawings which accompany and form a part of this specification.

Figure 1:
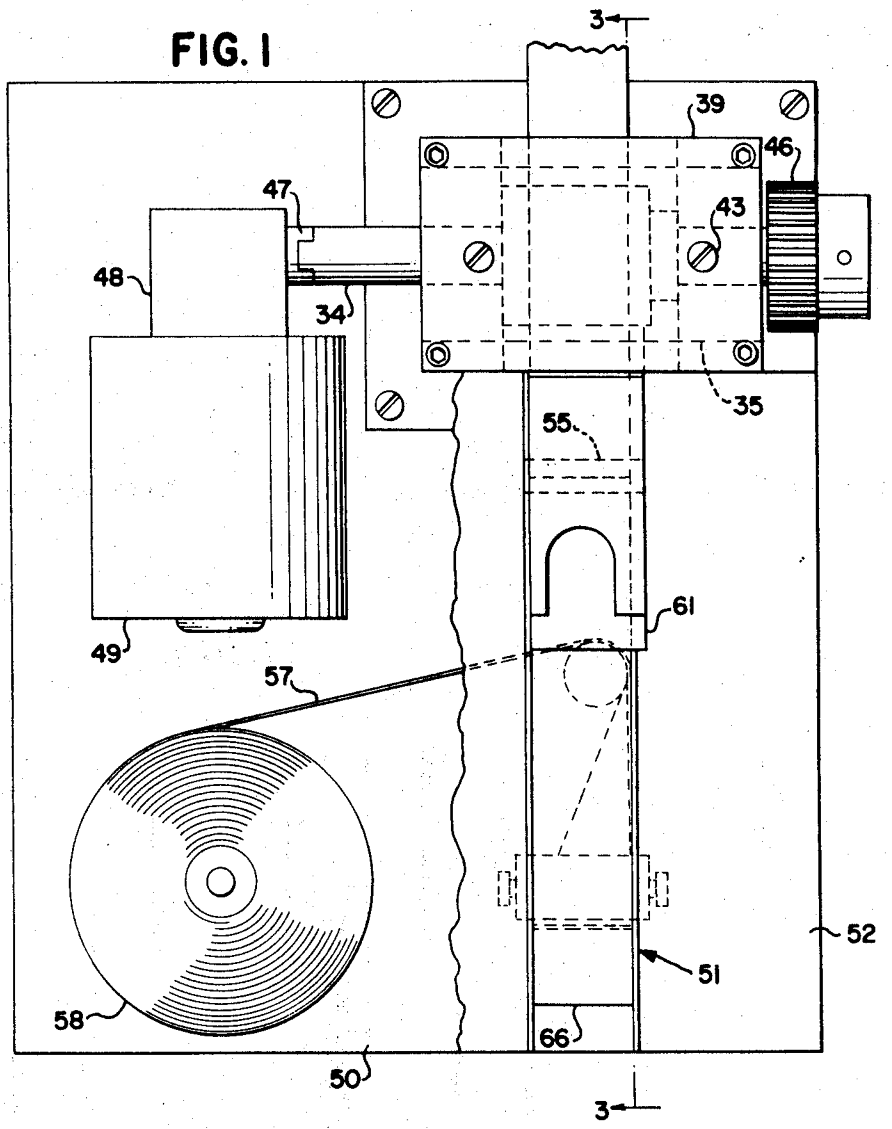
FIG. 1 is a top plan view of the tag printer with part of the interior cut away, showing the supply of pressure-sensitive tape and the drive motor for the pressure rollers.
Figures 3, 4:
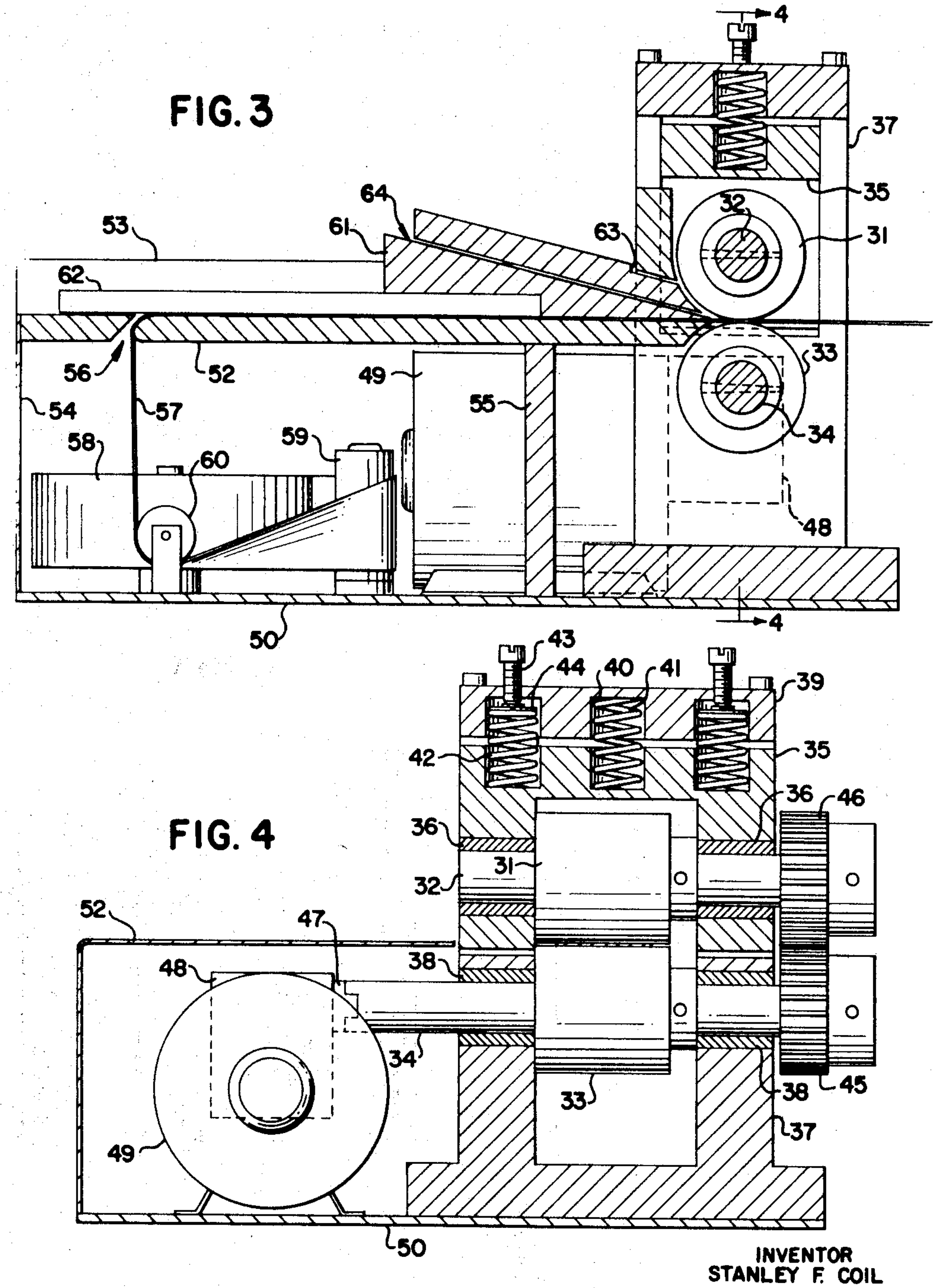
FIG. 3 is a sectional view taken along the line 3—3 of FIG. 1.
FIG. 4 is a sectional view taken along the line 4—4 of FIG. 3.

The printing mechanism as shown in FIGS. 1, 3, and 4 is adapted for use with a cash register or other merchandising apparatus used at the point of sale. The printer includes an upper pressure roller 31, pinned to a shaft 32, and a lower pressure roller 33, pinned to a shaft 34. The shaft 32 is rotatably mounted in a support member 35 by means of a bushing 36. The shaft 34 is similarly mounted in a support housing 37 by means of a bushing 38. As shown in FIGS. 1 and 3, the support member 35 is slidably mounted within the support housing 37. Bolted to the top of the support housing 37 is a cover 39, having located therein three holes 40, each of which contains a spring 41. As shown more clearly in FIG. 4, each of the holes 40 coacts with similarly-aligned holes 42, located in the top of the support member 35, to allow the spring 41 to exert a pressure on the support member 35. This pressure is controlled by a pair of screws 43, mounted in the cover 39, each of which engages a pressure plate 44 supported on the top of two of the springs 41. The spring in the middle hole, as shown in FIG. 4, acts to provide constant pressure on the support member 35.

Pinned to one end of the shaft 34 is a drive gear 45, which engages and drives a gear 46 pinned to the end of the shaft 32. The other end of the shaft 34 engages the drive shaft 47 of a gear box 48 mounted on a motor 49. The motor 49 is mounted on the bottom frame member 50 of the printer, which also supports the housing 37. Both the housing 37 and the motor 49 are attached to the bottom frame member by conventional fastening means. It will be seen from this arrangement that operation of the motor 49 results in the driving of the pressure rollers 31 and 33 in such a direction as to move a recording tape 57, engaged by both rollers, from left to right as viewed in FIG. 3.

Associated with the pressure rollers 31 and 33 is a guide chute generally indicated as 51 in FIG. 1. As shown in FIG. 3, the chute comprises a support member 52 and a pair of side walls 53. The chute is attached to the front frame member 54 of the printer and a support 55 mounted on the bottom frame member 50. A slot 56, formed in the front portion of the support member 52, allows the recording tape 57 to move from a supply roll 58, supported on the bottom frame member 50, over a pair of guide rollers 59, 60, each mounted on the bottom frame member 50, along the guide chute 51 into engagement with the pressure rollers 31 and 33.

Figure 2:
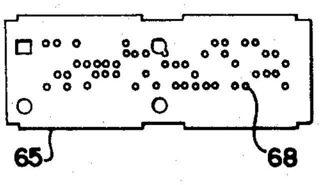
FIG. 2 is a view of a merchandise tag showing an arrangement of punched holes representing merchandise data.

Positioned in the guide chute is an insertable tag guide member 61, which has an elongated front portion 62 extending along the chute. The top portion of the tag guide has a blocking surface 63, which limits the forward travel of the tag guide. A slot 64, formed in the top portion, provides access to the pressure rollers 31 and 33. In the operation of the tag printer, a merchandise tag, similar to the tag 65 shown in FIG. 2, is inserted into the slot 64 of the tag guide 61. The motor 49 may then be operated intermittently or continuously, depending on the method of the operation. Insertion of the tag into the slot 64 positions the leading edge of the tag into engagement with the pressure rollers 31 and 33. Operation of the pressure rollers draws the tag between the pressure rollers.

Figure 5:
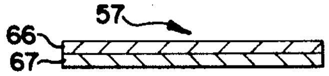
FIG. 5 is an enlarged cross section of the recording tape showing the two layers of paper which make up the tape.

Associated with this operation is the recording tape 57. As shown more fully in FIG. 5, this tape consists of two strips of paper 66, 67, the interface of the strip 66 having a coating of ink-containing rupturable capsules similar in construction to those capsules disclosed in United States Patent No. 2,800,457, issued to Barrett K. Green and Lowell Schleicher on July 23, 1957, and in United States Patent No. 2,712,507, issued to Barrett K. Green on July 5, 1955. The upper surface of the strip 67 has a clay coating. As disclosed in the above-cited Green United States patents, pressure on the tape ruptures the capsules, allowing ink contained therein to be transferred to the surface of the strip 67. In the operation being described, the merchandise tag 65 is drawn between the pressure rollers along with the tape 57. This action results in the capsules on the upper strip 66 of the tape being ruptured in those areas which are covered by the tag. Those areas covered by the punched holes will remain in their original condition. As the merchandise tag moves between the pressure rollers, there is reproduced on the lower sheet strip 67 an outline of the tag 65, which the holes 68 of the merchandise tag contrasting with the darker areas of the tag represented by the ink from the ruptured capsules. The pressure-sensitive recording tape 57 may also be of the construction disclosed in United States Patent No. 2,730,457, issued to Barrett K. Green and Lowell Schleicher on January 10, 1956, wherein the capsules and the clay coating are on one surface, thus eliminating the need for the extra strip of tape as recited above. It is obvious that other record materials, using different transfer methods, may be used to produce a similar result. Thus, carbon paper may be substituted for the capsule-coated strip. The processed tape 57 then may be used with an optical reader which is capable of distinguishing light areas from dark areas for the processing of the information represented by the holes.

The construction of the printer allows for the reproduction of any type of punched media. Thus punched tape may be reproduced. In this appliction, provision is made to feed the punched tape under the guide member 61 within the chute 51 to the pressure rollers. It will be seen from FIG. 3 that this is similar to the guide path of the recording tape 57.

The pressure exerted by the pressure rollers is critical in that the amount of pressure must be sufficient to rupture all the capsules covered by the tag structure but yet not large enough to damage the tag or the tape 57. In the application just described, a pressure of 250 pounds was found to satisfy the above requirements.

Another critical requirement of this tag printer is that alignment of the holes of the printed tag on the tape must be constant between tags, so that the tapes may be read continuously by the optical reader. The combination of the guide chute 51 and the position of the front portion 62 of the tag guide member 61 on the tape provides an alignment of both of the sheets 66 and 67 of the tape and also of the tape and the tag. This is due partly to the pressure exerted on the tape 57 by the tag guide member 61. As shown in FIG. 1, the top portion of the guide member 61 overhangs one of the side walls 53 of the chute 51 to allow for the dimensional character of the tag. This construction may be varied, depending on the dimensions of the tag to be reproduced.

It will be seen from this construction that, by merely inserting a merchandise tag into the chute 61, a reproduction of the tag will be made on a tape which is later read by an optical reader as a data input device for a computer to complete the data-processing procedure. The reproduction of the merchandise tag on the pressure-sensitive tape eliminates costly equipment and reduces the number of operations used in connection with this system.

While the form of the invention shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. A mechanism for reproducing on a record material having a coating of ink-containing pressure-rupturable capsules the image of a merchandise tag having a plurality of punched holes representing data, comprising, in combination, (a) a support member;

(b) a first roller mounted for rotation in said support member;

(c) a second roller slidably mounted in said support member and rotatably engaging said first roller;

(d) means continuously engaging said second roller for urging said second roller into engagement with said first roller;

(e) an elongated chute member mounted adjacent said rollers;

(f) a record material having a coating of ink-containing pressure-rupturable capsules positioned in said chute member and guided thereby into engagement with said first and second rollers;

(g) a merchandise tag guide member positioned within said chute member, said guide member having a tag-receiving slot, one end of which is located adjacent said first and second rollers;

(h) and means for driving said first and second rollers whereby a tag positioned within said tag-receiving slot is driven between said rollers together with said record material to reproduce on said record material the image of said tag.

2. A mechanism for reproducing on a record material the image of a merchandise tag having a plurality of punched holes, comprising, in combination, (a) a support member;

(b) a first pressure roller mounted for rotation in said support member;

(c) a second pressure roller slidably mounted in said support member and rotatably engaging said first pressure-roller;

(d) resilient means continuously engaging said second roller for urging said second roller into engagement with said first roller;

(e) a record material in contact with a manifold sheet having a transfer coating of marking material;

(f) an elongated chute member mounted adjacent said rollers and adapted to guide said record material and said manifold sheet into engagement with said rollers;

(g) a tag guide member positioned within said chute and on said record material, said member having an inclined tag-receiving slot;

(h) means located on said member for positioning said member within said chute in such a manner as to locate the rear opening of said tag-receiving slot adjacent said pressure rollers;

(i) and motor means for driving said pressure rollers whereby a merchandise tag positioned within said receiving slot is driven, together with said record material and manifold sheet, through said pressure rollers to reproduce on said record material the image of the merchandise tag.

References Cited by the Examiner

UNITED STATES PATENTS

| | | | |
|---|---|---|---|
| 978,500 | 12/10 | Spiegel | 101—128.4 X |
| 1,776,368 | 9/30 | Novotny | 101—128.4 X |
| 2,054,152 | 9/36 | Wood | 101—129 X |
| 2,582,685 | 1/52 | Eisler | 101—129 X |
| 2,712,507 | 7/55 | Green | 117—36.2 |
| 2,730,457 | 1/56 | Green | 116—36.1 |
| 2,975,282 | 3/61 | Schaffer | 101—369 |

WILLIAM B. PENN, *Primary Examiner.*